(12) United States Patent
Turner

(10) Patent No.: US 6,867,687 B2
(45) Date of Patent: Mar. 15, 2005

(54) SIDEBAND DIVERSITY READER FOR ELECTRONIC IDENTIFICATION SYSTEM

(75) Inventor: Christopher Gordon Gervase Turner, Gauteng (ZA)

(73) Assignee: Supersensor (Proprietary) Limited, Gauteng (ZA)

( * ) Notice: Subject to any disclaimer, the term of this patent is extended or adjusted under 35 U.S.C. 154(b) by 364 days.

(21) Appl. No.: 09/877,438

(22) Filed: Jun. 8, 2001

(65) Prior Publication Data

US 2002/0017981 A1 Feb. 14, 2002

(30) Foreign Application Priority Data

Jun. 12, 2000 (ZA) .......................................... 2000/2938

(51) Int. Cl.[7] .......................... G05B 19/00; G05B 25/00
(52) U.S. Cl. .................... 340/10.2; 340/10.3; 340/10.4; 340/10.1; 340/505; 340/572.2; 340/572.4; 340/825.71
(58) Field of Search .............................. 340/10.2, 10.3, 340/10.4, 10.1, 505, 572.2, 572.4, 825.71, 825.73; 342/48; 329/357, 356; 375/270; 455/17, 133, 134, 135, 47

(56) References Cited

U.S. PATENT DOCUMENTS

| 4,556,883 | A | * | 12/1985 | Strietzel ..................... 340/10.4 |
| 5,095,309 | A | * | 3/1992 | Troyk et al. ................ 340/10.3 |
| 6,064,320 | A | * | 5/2000 | d'Hont et al. .............. 340/933 |
| 6,232,919 | B1 | * | 5/2001 | Marumoto et al. ......... 342/372 |
| 6,584,304 | B1 | * | 6/2003 | Thomsen et al. ........ 455/188.1 |

FOREIGN PATENT DOCUMENTS

EP              649111         *  4/1995  ............ G06K/7/10

* cited by examiner

Primary Examiner—Michael Horabik
Assistant Examiner—Vernal Brown
(74) Attorney, Agent, or Firm—Fish & Richardson P.C.

(57) ABSTRACT

An electronic radio frequency identification system comprises a reader 12 and a plurality of transponders to be read by the reader. The reader comprises a recovery circuit 32 for recovering and separating an upper sideband 26.12 and a lower sideband 26.11 of a modulated response signal 26.1 from one of the transponders. The reader further comprises an evaluating circuit 38 for evaluating and selecting one of the upper sideband the lower sideband for output to a next stage, based on the evaluation.

7 Claims, 3 Drawing Sheets

US 6,867,687 B2

SIDEBAND DIVERSITY READER FOR ELECTRONIC IDENTIFICATION SYSTEM

INTRODUCTION AND BACKGROUND

THIS invention relates to electronic radio frequency identification (RFID) systems and more particularly to a reader or receiver forming part of such a system.

In known systems of the aforementioned kind, the reader transmits an interrogation signal towards a transponder population. Each transponder comprises an antenna connected to an integrated chip hosting electronic circuitry of the transponder, including a modulator and a controller. In response to the interrogation signal, the transponder modulates, by utilizing backscatter modulation, the impinging interrogation signal with digital data to be transmitted to the reader. This is done by the controller causing the modulator to cause a deliberate mismatch between an input impedance of the chip and an impedance of the antenna, in accordance with the digital data to be transmitted.

The resulting signal is an amplitude modulated signal comprising an upper sideband and a lower sideband on either side of a carrier frequency, which normally is the frequency of the energizing signal.

Most known readers comprise wideband receivers for receiving both sidebands and converting them directly to baseband utilizing the carrier frequency.

A problem with the known systems is that the broadband receiver is susceptible to noise generated by other transponders or another source (e.g. another similar system, a cellular telephone etc) in one or both of the upper sideband and the lower sideband. Even if one sideband is unaffected, the present readers cannot decode the data received.

In U.S. Pat. No. 6,064,320 to d'Hont et al there are disclosed single sideband readers that are used adjacent to each other at a toll plaza for respective lanes of a multi-lane road. The one reader would be a lower sideband reader only and the adjacent reader an upper sideband reader only. The purpose of this alternating arrangement is simply to maintain signal separation between the readers. If the signal in the relevant operative band is bad, the reader cannot decode the data received.

OBJECT OF THE INVENTION

Accordingly, it is an object of the present invention to provide a reader or receiver and an associated method with which the applicant believes the aforementioned problems may at least be alleviated.

SUMMARY OF THE INVENTION

According to the invention there is provided a reader for an electronic radio frequency identification system also comprising a plurality of transponders to be read by the reader, the reader comprising:
 a first recovery circuit for recovering and separating an upper sideband and a lower sideband of a modulated response signal from one of the transponders; and
 a first evaluating circuit for evaluating and selecting one of the upper sideband and the lower sideband for output to a next stage, based on the evaluation.

The evaluating circuit may evaluate the upper sideband and lower sideband on signal to noise ratio criteria. Alternatively or in addition, the evaluating circuit may evaluate the upper sideband and the lower sideband on minimum errors in data decoded from the sidebands.

The first recovery circuit may comprise an image reject mixer having a first output for the lower sideband and a second output for the upper sideband.

The reader may further comprise a switch for selecting between the first output and the second output in response to a selection signal from the evaluating circuit.

An output of the switch may be connected to a first data decoder circuit for providing decoded data.

The reader may further comprise an energizing signal generator for energizing passive transponders. The energizing signal generator may be connected to the image reject mixer, to convert the response signal down to baseband.

The reader may comprise a single antenna for transmitting the energizing signal and for receiving the response signal. The antenna may be connected to the energizing signal generator by a strip line.

The response signal may be coupled to the first recovery circuit by a first directional coupler cooperating with the strip line.

The reader may further comprise a second recovery circuit for recovering and separating an upper sideband and a lower sideband of a modulated response signal form one of the transponders.

The response signal may be coupled to the second recovery circuit by a second directional coupler cooperating with the strip line.

The first and second directional couplers may be spaced from one another an electrical distance of between $\lambda c/4$ to $\lambda c/6$, preferably $\lambda c/5$ along the strip line, wherein $\lambda c$ is the wavelength of the energizing signal.

The second recovery circuit may comprise a second image reject mixer having a first output for the lower sideband and a second output for the upper sideband.

The reader may comprise a second switch for selecting between the first output and the second output of the second mixer in response to a selection signal from the evaluating circuit. An output of the second switch may be connected to a second data decoder for providing decoded data.

An output of the first data decoder and an output of the second data decoder may be connected to a selection switch and the selection switch may be operative to connect a selected one of the output of the first data decoder and the output of the second data decoder to an output of the selection switch in response to a control signal from the evaluating circuit and based on minimum requirements for errors in the decoded data.

The invention also includes within its scope an electronic radio frequency identification system comprising a plurality of transponders and a reader as herein defined and/or described.

Further included within the scope of the present invention is a method of reading a response signal from an electronic radio frequency transponder, the method comprising the steps of:
 receiving the signal;
 utilizing demodulating techniques to recover and separate an upper sideband and a lower sideband of the signal;
 evaluating the upper and lower sidebands; and
 utilizing best performance criteria automatically to select one of the upper sideband and the lower sideband for further processing.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
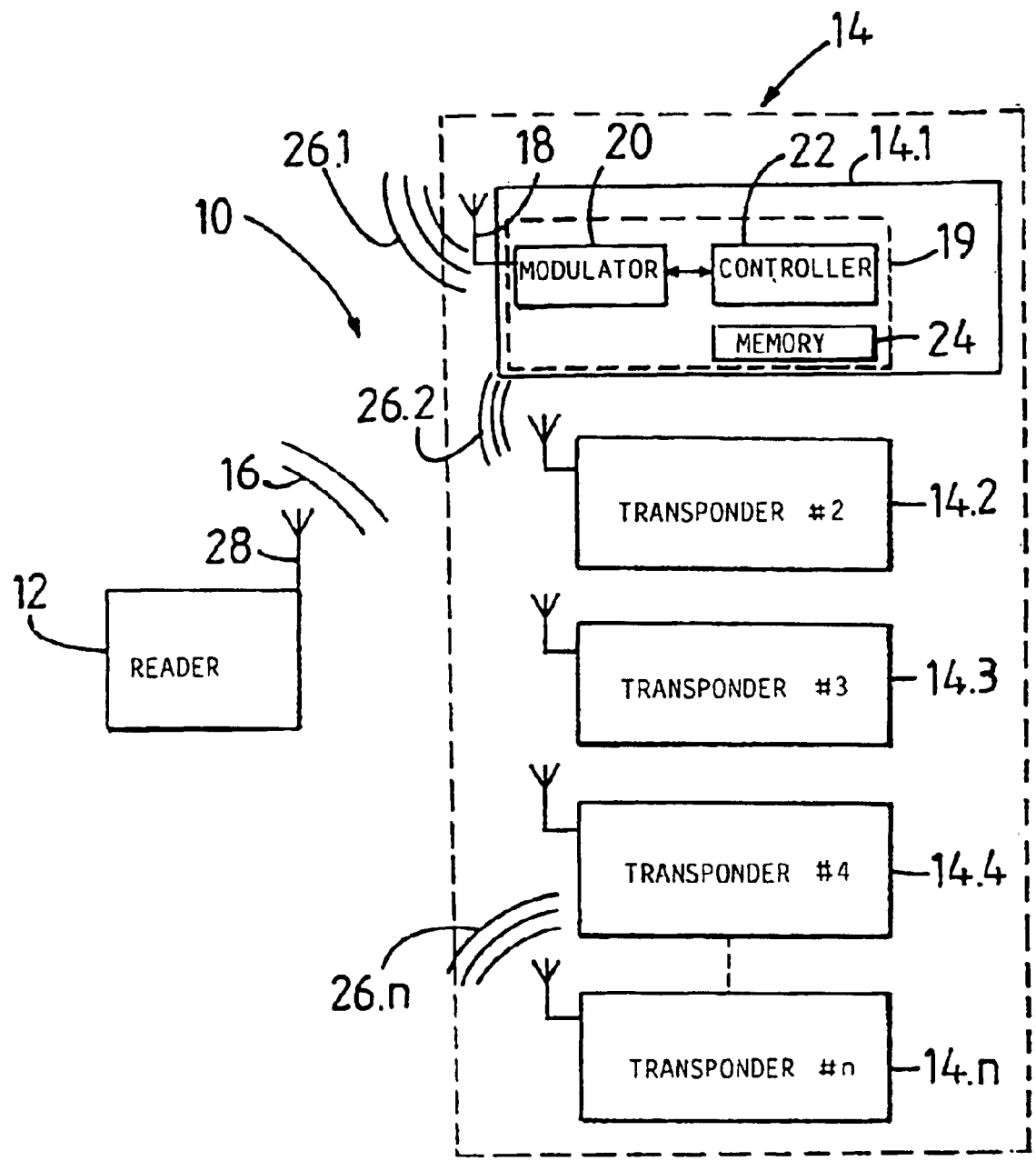
FIG. 1 is a block diagram of an electronic radio frequency identification system.

An electronic radio frequency identification (RFID) system according to the invention is generally designated by the reference numeral 10 in FIG. 1.

The system comprises a reader 12 and a transponder population 14 comprising transponders 14.1 to 14.n. In use the transponders may be mounted on or otherwise associated with items or articles (not shown) to be counted or identified. The transponders may be active transponders comprising their own local power supplies or they may be passive transponders in that they derive power to operate from an energizing signal 16 transmitted by the reader. The transponders are similar in configuration and therefore transponder 14.1 only will be described further. Transponder 14.1 comprises an antenna 18, an integrated circuit 19 connected to the antenna and comprising a modulator 20, a controller 22 and a memory arrangement 24.

In use, the reader transmits an energizing signal 16 having a frequency $f_c$ towards the transponder population 14. The frequency $f_c$ may be 900 MHz, for example. The transponders derive their power from this signal (as hereinbefore described), transmit respective response signals 26.1 to 26.n by backscatter modulating the signal in known manner with data prestored in memory arrangement 24. The reader sequentially locks onto one of the response signals and reads the data as will hereinafter be described. Once the population has been read, the aforementioned items are identified and/or counted.

Figure 2:
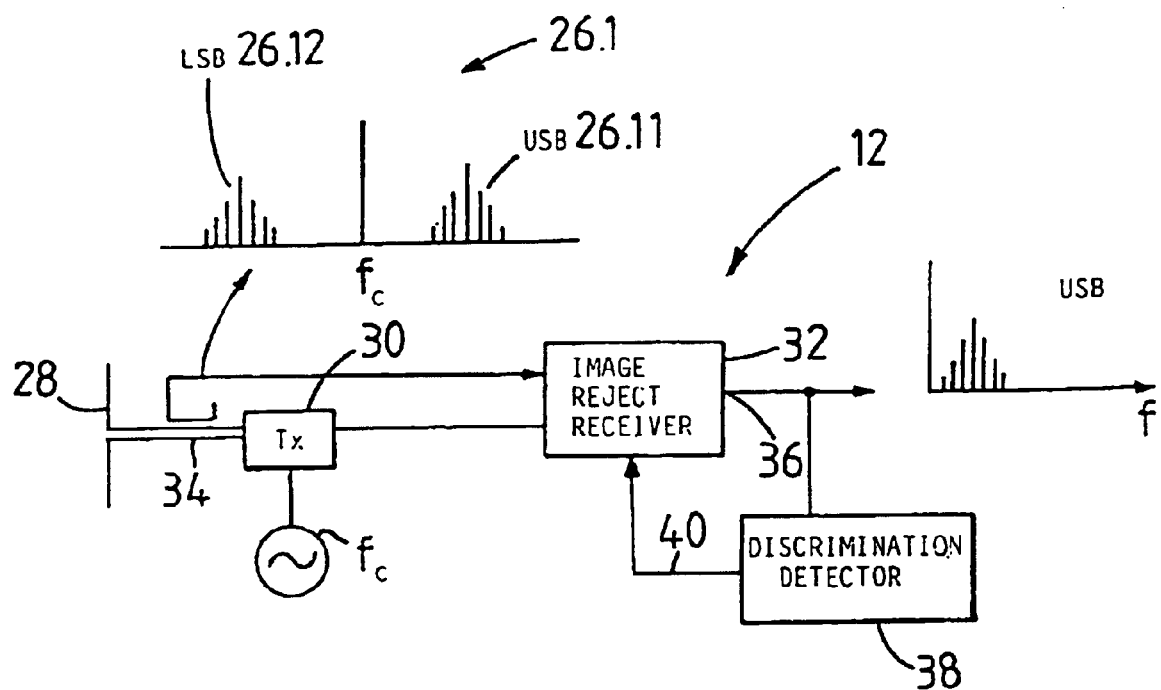
FIG. 2 is a block and frequency spectrum diagram for a reader according to the invention forming part of the system.

As shown in FIG. 2, the resulting response signal 26.1 is an amplitude modulated signal comprising an upper sideband (USB) 26.11 and a lower sideband (LSB) 26.12 on either side of a carrier with frequency $f_c$.

A first embodiment of the reader 12 according to the invention is shown in FIG. 2. The reader comprises an antenna 28 and transmitter 30 for the energizing signal 16 having frequency $f_c$. The transmitter is connected to the antenna to transmit the energizing signal 16 and is also connected to a phasing type image reject receiver 32. The received response signal 26.1 is directionally coupled at 34 to the image reject receiver 32. An output 36 of the receiver is connected to a discrimination detector 38 and fed back to the image reject receiver via a sideband select control path 40. In use, the discrimination detector 38 evaluates the upper and lower side bands on best performance criteria such as signal to noise ratio and/or minimum errors in the data and automatically selects the better sideband (say the USB 26.11) to be made available as a baseband signal at output 36 to downstream circuitry for further processing.

Figure 3:
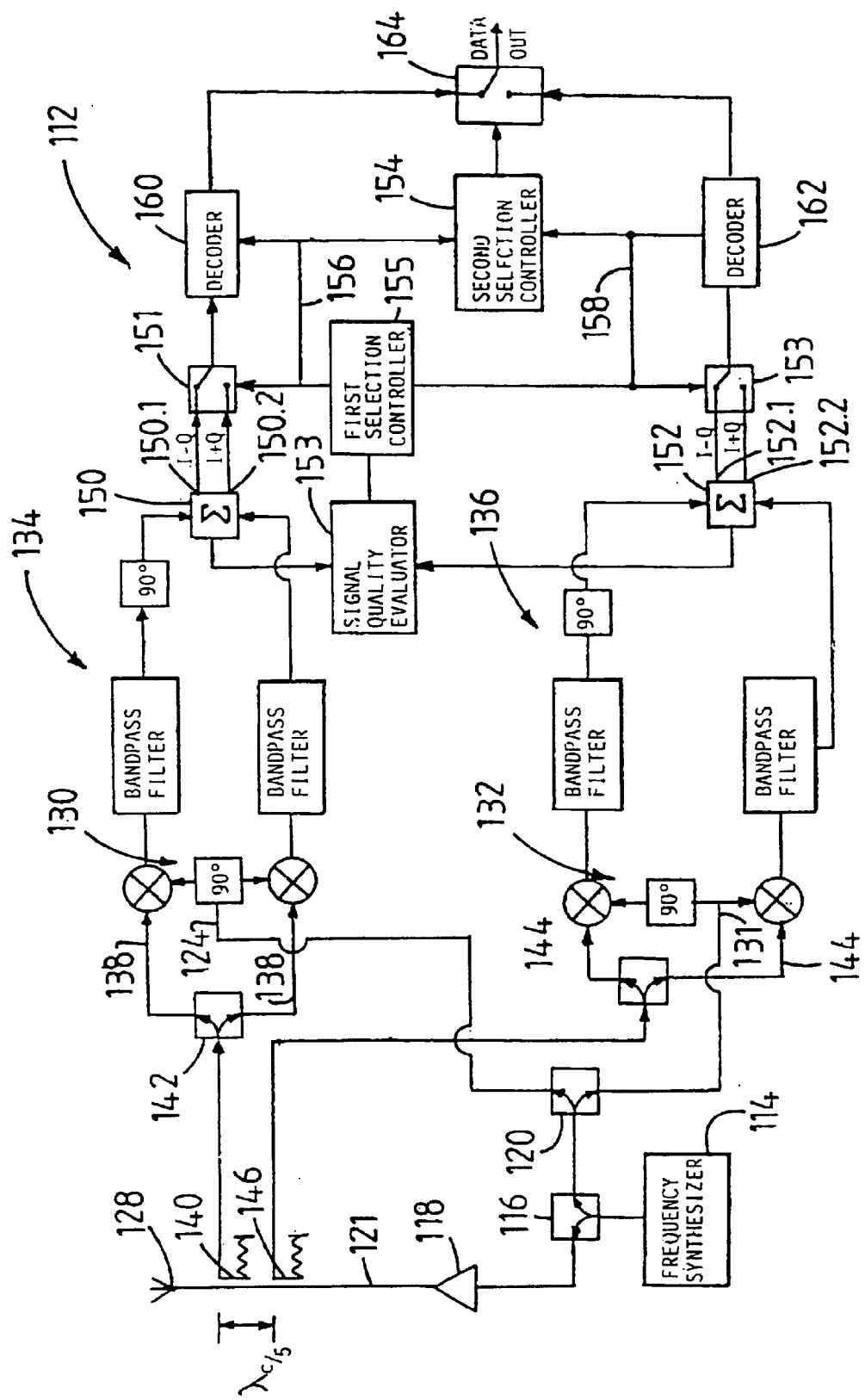
FIG. 3 is a block diagram of another embodiment of the reader.

Another embodiment of the reader is shown in FIG. 3 and designated 112. The reader 112 comprises a frequency synthesizer 114 for generating the energizing signal having a frequency $f_c$. The signal may be a monotone signal or may hop in frequency through a frequency band. The synthesizer is connected via a first power divider 116 to a power amplifier 118 as well as to a second power divider 120. An output of the amplifier is connected via strip line 121 to antenna 128 via which the energizing signal is transmitted.

First and second outputs of the second power divider 120 are connected to first inputs 124 and 131 respectively of first and second balanced quadrature mixers 130 and 132, of respective balanced image reject mixers 134 and 136. A second input 138 of balanced quadrature mixer 130 is derived from a first directional coupler 140 cooperating with line 121 and which is split by power splitter 142. A second input 144 of balanced quadrature mixer 132 is derived from a second directional coupler 146 which is spaced an electrical distance of between $\lambda_c/4$ to $\lambda_c/6$ (preferably $\lambda_c/5$) from first coupler 140 along line 121, where $\lambda_c=c/f_c$ and $c=3\times10^{8\ m/s}$. In a possible practical implementation an electrical distance of $\lambda_c/5$ translates to a physical length of about 4.6 cm.

At outputs 150.1 and 150.2 of adder 150 of mixer 134 there are available the lower (LSB) and upper sidebands (USB) respectively of a response signal 26.1 received from transponder 14.1. The lower sideband (LSB) and upper sideband (USB) of the signal are also available at outputs 152.1 and 152.2 respectively of adder 152 of mixer 136.

Adders 150 and 152 are connected to a sideband signal quality evaluator circuit 153. The circuit 153 evaluates the upper and lower sideband signals of each adder for the best signal to noise ratio.

The outputs 150.1 and 150.2 on the one hand and 152.1 and 152.2 on the other are selectable via switches 151 and 153 respectively, by a first selection controller 155 connected to signal quality evaluator circuit 153 and controllable by a first selection signal. The best sideband (upper or lower) in each case is decoded at decoder 160 or 162, to provide decoded data streams.

A further switch 164 which is controlled by second selection controller 154 enables, in response to a second selection signal, selection between the aforementioned data streams, typically on the basis of the lowest bit error rate or minimum errors in the data. An output of switch 164 is connected to downstream circuitry for further processing.

Although the couplers 140 and 146 are primarily spaced along strip line 121 to avoid the effect of nulls in the path of the response signal, it is possible, by providing two outputs for a modified switch 164, that signals from two transponders in the population 14 may be read simultaneously. The best sideband of the response signal from the first transponder is decoded by decoder 160 and that of the second transponder by decoder 162 for output via respective ones of the aforementioned two outputs of the modified switch 164.

It will be appreciated that there are many variations in detail on the reader, system and method according to the invention without departing from the scope and spirit of the appended claims.

What is claimed is:

1. A reader for an electronic radio frequency identification system comprising a plurality of transponders to be read by the reader, the reader comprising:

a first recovery circuit for recovering and separating an upper sideband and a lower sideband of a modulated response signal from one of the transponders;

a first evaluating circuit for evaluating and selecting one of the upper sideband and the lower sideband for output to a next stage, based on the evaluation; and a second recovery circuit for recovering and separating an upper sideband and a lower sideband of a modulated response signal form one of the transponders.

2. A reader as claimed in claim 1 comprising a generator for generating an energizing signal for energizing the transponders, an antenna for transmitting the energizing signal and for receiving the response signal, the antenna being connected to the energizing signal generator by a strip line and wherein the response signal is coupled to the first recovery circuit by a first directional coupler cooperating with the strip line and to the second recovery circuit by a second directional coupler cooperating with the strip line.

3. A reader as claimed in claim 2 wherein the first and second directional couplers are spaced from one another an electrical distance of between $\lambda^c/4$ to $\lambda^c/6$ along the strip line.

4. A reader as claimed in claim 1 wherein the first recovery circuit comprises a first image reject mixer having a first output or the lower sideband and a second output for the upper sideband and wherein the second recovery circuit comprises a second image reject mixer having a first output for the lower sideband and a second output for the upper sideband.

5. A reader as claimed in claim 4 comprising a first switch for selecting between the first output and the second output of the first image reject mixer in response to a first selection signal from the evaluating circuit and a second switch for selecting between the first output and the second output of the second mixer in response to a selection signal from the evaluating circuit.

6. A reader as claimed in claim 5 wherein an output of the first switch is connected to a first data decoder for providing decoded data and the output of the second switch is connected to a second decoder for providing decoded data.

7. A reader as claimed in claim 6 wherein an output of the first data decoder and an output of the second data decoder are connected to a selection switch and wherein the selection switch is operative to connect a selected one of the output of the first data decoder and the output of the second data decoder to an output of the selection switch in response to a control signal from the evaluating circuit and based on minimum requirements for errors in the decoded data.

* * * * *